United States Patent [19]
Yamaguchi et al.

[11] Patent Number: 5,895,109
[45] Date of Patent: Apr. 20, 1999

[54] PROJECTOR

[75] Inventors: Makoto Yamaguchi; Hiroshi Horiuchi, both of Kanagawa, Japan

[73] Assignee: Sony Corporation, Tokyo, Japan

[21] Appl. No.: 08/728,897

[22] Filed: Oct. 10, 1996

[30] Foreign Application Priority Data

Oct. 12, 1995 [JP] Japan .................... 7-290301

[51] Int. Cl.$^6$ .................... G03B 21/14
[52] U.S. Cl. .................... 353/31; 353/34; 353/99; 348/771
[58] Field of Search .................... 353/31, 33, 34, 353/37, 81, 98, 99; 359/849, 847; 348/771

[56] References Cited

U.S. PATENT DOCUMENTS

| | | |
|---|---|---|
| 5,379,135 | 1/1995 | Nakagaki et al. . |
| 5,420,655 | 5/1995 | Shimizu .................... 353/34 |
| 5,467,154 | 11/1995 | Gale et al. .................... 353/77 |
| 5,486,881 | 1/1996 | Hwang .................... 353/34 |
| 5,560,697 | 10/1996 | Lim .................... 353/34 |
| 5,575,548 | 11/1996 | Lee .................... 353/34 |
| 5,592,239 | 1/1997 | Hara .................... 348/771 |
| 5,612,753 | 3/1997 | Poradish et al. .................... 348/771 |

FOREIGN PATENT DOCUMENTS

| | | |
|---|---|---|
| 0 395 156 | 10/1990 | European Pat. Off. . |
| 0 434 041 | 6/1991 | European Pat. Off. . |
| 0 443 586 | 8/1991 | European Pat. Off. . |
| 0 485 268 | 5/1992 | European Pat. Off. . |
| A 492 636 | 7/1992 | European Pat. Off. . |
| 0 523 988 | 1/1993 | European Pat. Off. . |
| 0 547 601 | 6/1993 | European Pat. Off. . |
| WO 93 18620 | 9/1993 | WIPO . |

*Primary Examiner*—William Dowling
*Attorney, Agent, or Firm*—Frommer Lawrence & Haug LLP; William S. Frommer

[57] ABSTRACT

A projector to be simple and capable of being miniaturized. White light is decomposed by a color decomposition/composition device into red light, green light, and blue light, which are incident to a first, second, and third mirror deflection type light modulators and first effective reflected light to third effective reflected light obtained by the first, second, and third mirror deflection type light modulators are composed together, so that color decomposition/composition can be performed by the color decomposition/composition device eliminating the necessity of separately provided color decomposition and composition optical systems, and consequently it is possible to construct the optical system with ease, thereby realizing a projector which is simple and can be miniaturized.

8 Claims, 5 Drawing Sheets

PROJECTOR

BACKGROUND OF THE INVENTION

1. Field of the Invention

This invention relates to a projector, and more particularly, is applicable to a projector for projecting a color image.

2. Description of the Related Art

Heretofore, as a projector of this kind, there has been the projector employing a mirror deflection type light modulator (referred to as a mirror light valve hereinafter, Digital Micromirror Device, DMD) which comprises minute mirror elements arranged on a plane each corresponding to each pixel and utilizes the reflection of each mirror element.

In the projector, light based on the red, green and blue components of an image data is formed by respectively corresponding mirror light valves as an image source and the thus formed light based on the red, green and blue light components is projected enlargedly onto a screen to form a color image thereon based on the image data.

Figure 1:
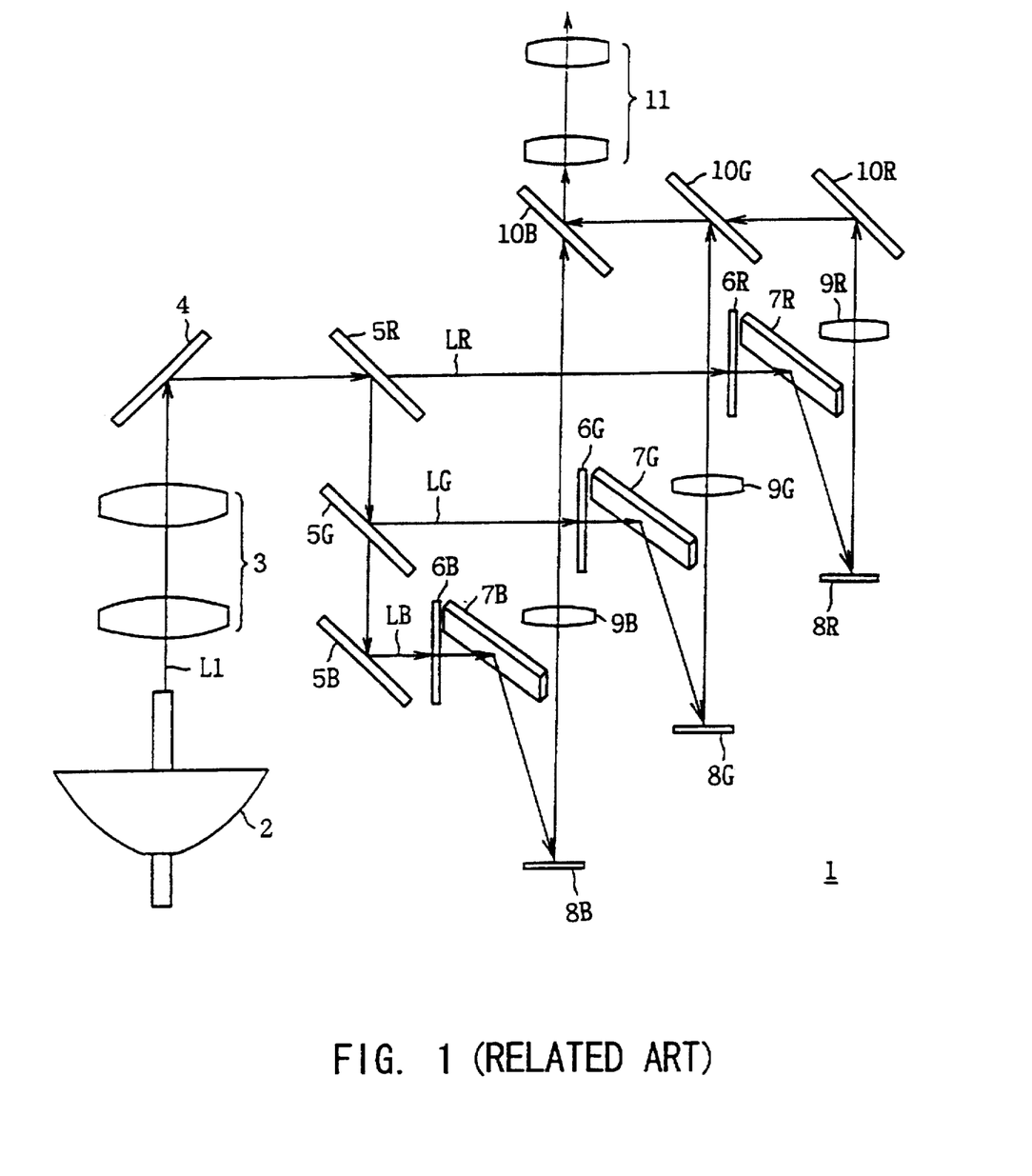
FIG. 1 is a schematic plan view showing the structure of an optical system in a projector employing a conventional mirror deflection type light modulator.

FIG. 1 shows an example of the projector employing three mirror light valves respectively corresponding to the red, green, and blue components of the image data.

In the projector 1, white light consisting of substantially parallel light emitted from a high luminance white light source 2 (referred to as projection light hereinafter) L1 passes through an ultra violet (UV) cut filter (not shown) to get rid of unnecessary ultra violet therefrom and through a condenser lens 3 to be converted into parallel light having a narrower beam diameter so as to be incident to decomposing dichroic mirrors 5R, 5G, and 5B by a first reflecting mirror 4.

The decomposing dichroic mirrors 5R, 5G, and 5B decompose in color the incident projection light L1 into red light LR, green light LG, and blue light LB. The red light LR, green light LG, and blue light LB pass through beam shaping cylindrical lenses 6R, 6G, and 6B to be subjected to beam shaping therein and are incident by way of second reflecting mirrors 7R, 7G, and 7B to the reflecting surfaces of mirror light valves 8R, 8G, and 8B in such a manner as to be homogeneous thereon in illumination distribution.

Each of the mirror light valves 8R, 8G, and 8B comprises a plurality of minute mirror elements respectively arranged in accordance with the arrangement of image data pixels. Each minute mirror element is arranged to correspond to each memory cell of a frame memory which cell corresponds in arrangement to each pixel of the image data, and is separately varied in inclination in accordance with the state of its corresponding memory cell so as to selectively reflect light incident thereto as effective reflected light necessary for forming an image or ineffective reflected light.

In the projector 1, image data for one frame respectively based on red, green, and blue components are set in frame memories corresponding to the mirror light valves 8R, 8G, and 8B respectively, and a driving circuit (not shown) drives under control the minute mirror elements based on the image data to form effective red light, effective green light, and effective blue light as effective reflected light. The effective red light, effective green light, and effective blue light are focused by their corresponding relay lenses 9R, 9G, and 9B respectively, and are directed to composing dichroic mirrors 10R, 10G, and 10B to be composed into color image light, which is enlargedly projected onto a screen (not shown) provided outside the projector 1 apart therefrom by way of a projector lens 11 having a zoom lens structure.

In this way, the projector 1 is capable of projecting a color image based on an image data.

Whereas the projector 1 having such a structure had a problem of becoming complicated in the optical system thereof and consequently large as a whole, since the projector 1 comprised an optical system for decomposing the projection light L1 emitted from the high luminance white light source 2 into the red light LR, green light LG, and blue light LB and an optical system for composing the effective red light, effective green light, and effective blue light respectively formed by the mirror light valves 8R, 8G, and 8B into color image light.

Thus the projector 1 had a problem that it used many optical components to be increased in cost.

The projector 1 had also a problem that it was troublesome to attach the optical components thereto or adjust the attached optical components since it used many optical components.

SUMMARY OF THE INVENTION

In view of the foregoing, an object of this invention is to provide a projector which is simple and can be miniaturized.

The foregoing object and other objects of the invention have been achieved by the provision of a projector comprising a color decomposition/composition means for decomposing white light in color into red light, green light, and blue light, which are incident to a first, a second, and a third mirror deflection type light modulators respectively, and for composing together a first effective reflected light to third effective reflected light respectively obtained from the first, second, and third mirror deflection type light modulators.

White light is decomposed by the color decomposition/composition means into red light, green light, and blue light which are incident to the first, second, and third mirror deflection type light modulators respectively and the first effective reflected light to third effective reflected light respectively obtained from the first, second, and third mirror deflection type light modulators are composed together. Therefore, the color decomposition/composition can be performed by the color decomposition/composition means eliminating the necessity of separately provided color decomposition and composition optical systems, so that the optical system can be constructed easily.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) First Embodiment

Figure 2A:
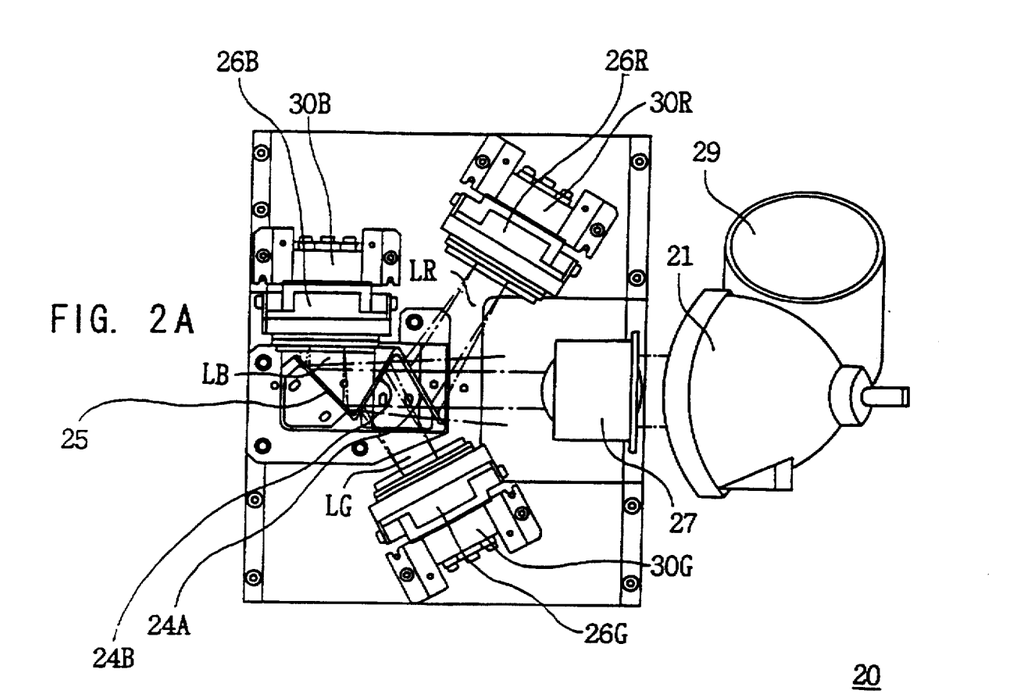
FIGS. 2A and 2B are a top view and a side view showing the structure of an optical system in a projector employing a mirror deflection type light modulator according to a first embodiment of the present invention.
Figure 2B:
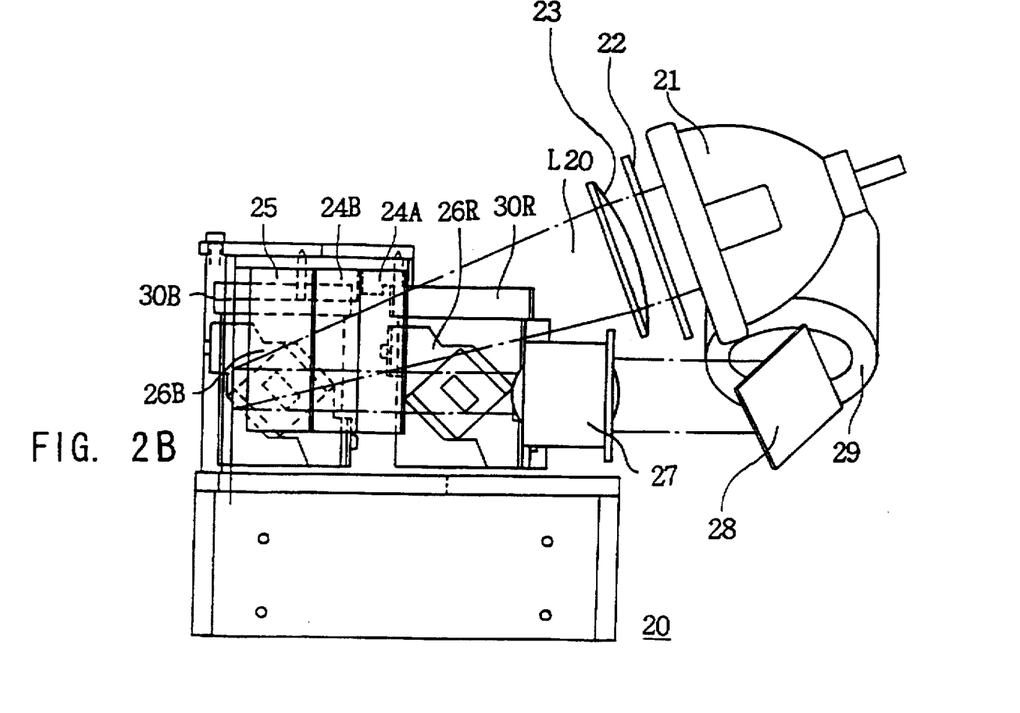

In FIGS. 2A and 2B, 20 shows a projector according to a first embodiment of the present invention as a whole. Projection light L20 composed of substantially parallel light emitted from a high luminance white light source 21 equipped with a reflector successively passes through a UV cut filter 22 and an infrared radiation (IR) cut filter (not shown) to get rid of unnecessary ultraviolet rays and infrared rays (heat rays) and is condensed while it passes through a condenser lens 23 to be incident to decomposing dichroic mirrors 24A, 24B and a reflecting mirror 25.

In this case, the decomposing dichroic mirrors 24A, 24B and the reflecting mirror 25 are combined with one another in zigzag, wherein one end of the decomposing dichroic mirror 24B is arranged to be at an angle of 60° relative to the decomposing dichroic mirror 24A while the other end of the decomposing dichroic mirror 24B is arranged to be at an angle of 75° relative to one end of the reflecting mirror 25. Further, the decomposing dichroic mirrors 24A, 24B and the reflecting mirror 25 are positioned such that the optical axis of the projection light L20 goes through them at an angle of 20° from the upper.

In the decomposing dichroic mirrors 24A, 24B and the reflecting mirror 25, the projection light L20 of incident white light is subjected to color decomposition by reflecting, e.g., red light LR by the decomposing dichroic mirror 24A, e.g., green light LG by the decomposing dichroic mirror 24B and e.g., blue light LB by the reflecting mirror 25.

The red light LR, green light LG, and blue light LB which are decomposed in color and reflected by the decomposing dichroic mirrors 24A, 24B and the reflecting mirror 25 are incident to the reflecting surfaces of mirror light valves 26R, 26G, and 26B which are arranged in such a manner that the red light LR, green light LG, and blue light LB have the same optical path length respectively.

Hereupon, the condenser lens 23 is selected to condense the projection light L20 according to the reflecting surface sizes of the mirror light valves 26R, 26G, and 26B so that the red light LR, green light LG, and blue light LB are incident to the reflecting surfaces of their corresponding mirror light valves 26R, 26G, and 26B with uniform illumination.

In this case, in each of the mirror light valves 26R, 26G, and 26B, a plurality of minute mirror elements each, for example, about 16 μm square corresponding to the pixel array (e.g., 768×576) of an image data are arranged to form a reflecting surface. The minute mirror elements are arranged corresponding to the memory cells of a frame memory which corresponds to the pixel array of the image data and the inclining state of each minute mirror element is separately varied in accordance with the state of its corresponding memory cell.

Figure 3A:
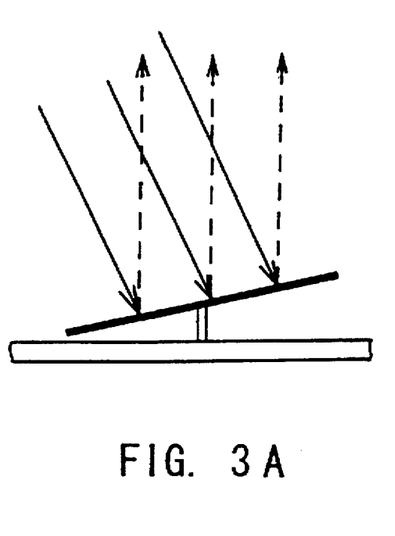
FIGS. 3A and 3B are schematic diagrams explaining the operation of a minute mirror element of the mirror deflection type light modulator.
Figure 3B:
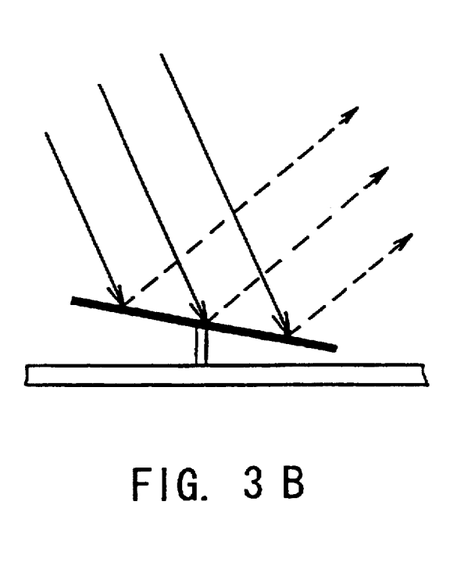

Practically, each minute mirror element is designed to be inclined by +10° when the memory cell is ON relative to a neutral state, i.e., effective as a pixel as shown in FIG. 3A, and on the contrary inclined by −10° when the memory cell is OFF, i.e., ineffective as a pixel as shown in FIG. 3B. The high luminance white light source 21 is disposed at an angle of 20° relative to the horizontal axis so that the red light LR, green light LG, and blue light LB are incident to the reflecting surfaces of the mirror light valves 26R, 26G, and 26B with an incident angle of 20° with regard to the optical axis thereof respectively.

Accordingly, the mirror light valves 26R, 26G, and 26B are designed to reflect the incident light by the minute mirror elements in two directions having an angle of 40° therebetween, one being that of effective reflected light necessary for forming the image and the other being that of ineffective light unnecessary for forming the image. Adding this, the reflecting surfaces of the mirror light valves 26R, 26G, and 26B are arranged to be inclined by −45° relative to the horizontal axis so as to prevent interference between the effective reflected light and the ineffective reflected light.

A frame of image data based on each of the red, green, and blue components is set in each frame memory-corresponding to each of the mirror light valves 26R, 26G, and 26B so that the same respectively form effective reflected light, i.e., effective red light, effective green light, and effective blue light based on the image data. The effective red light, effective green light, and effective blue light are reflected in a horizontal direction by minute mirror elements on the reflecting surfaces of the mirror light valves 26R, 26G, and 26B respectively to be incident to the decomposing dichroic mirrors 24A, 24B and the reflecting mirror 25 similarly to the color decomposition.

Accordingly, it is designed that the effective red light, effective green light, and effective blue light are reflected in a horizontal direction to avoid the optical paths of the red light LR, green light LG, and blue light LB so as to prevent interference between the former and the latter.

The decomposing dichroic mirrors 24A, 24B and the reflecting mirror 25 reflect the incident effective red light, effective green light, and effective blue light in a horizontal and same direction to compose the same into color image light, which is incident to a relay lens 27.

The incident color image light is condensed by the relay lens 27 to be focused at a given position and is incident to a reflecting mirror 28.

The incident color image light is reflected by the reflecting mirror 28 in a given direction to be incident to a light receiving surface of a projector lens 29 having a zoom lens structure.

In this case, the mirror light valves 26R, 26G, and 26B are respectively fixed to color adjusting mechanisms 30R, 30G, and 30B, which can adjust the positions, angles, etc., of the reflecting surfaces so as to prevent the composed color image light from being blurred in color and the like.

The relay lens 27 is designed to respectively have such a magnification as to condense the color image light so that the same becomes smaller in diameter than the aperture of the projector lens 29 to enter the projector lens 29 with certainty.

Further, the reflecting mirror 28 is inclined by 45° relative to the optical axis of the color image light to correct the −45° inclination of the color image light on the reflecting surfaces of the mirror light valves 26R, 26G, and 26B.

As a result, the color image light is enlargedly projected onto a screen (not shown) provided outside the projector 20 apart therefrom after passing through the projector lens 29. The projector 20 is thus designed to be able to project a color image based on an image data.

With the structure set forth above, the projector 20 decomposes the projection light L20 emitted from the high luminance white light source 21 into the red light LR, green light LG, and blue light LB by the decomposing dichroic mirrors 24A, 24B and the reflecting mirror 25 which are arranged in zigzag, forms the effective red light, effective green light, and effective blue light based on the image data by allowing the decomposed red light LR, green light LG, and blue light LB to be incident to their corresponding mirror light valves 26R, 26G, and 26B and reflects these effective red light, effective green light, and effective blue light by the decomposing dichroic mirrors 24A, 24B and the reflecting mirror 25 to compose them into color image light.

As described above, the projector 20 can constitute the color decomposition optical system and the color composition optical system as an optical system using the decomposing dichroic mirrors 24A, 24B and the reflecting mirror 25 which are arranged in zigzag, so that it is possible to construct a smaller and simpler optical system compared with a conventional one.

As a result, the number of optical components can be reduced in the projector 20, so that it is possible to construct the optical system at low cost and miniaturize the projector 20 as a whole.

Moreover, the projector 20 has few optical components, so that it is possible to assemble the optical components with ease and further adjust the assembled optical components with ease.

Furthermore, the projector 20 comprises the relay lens 27 and the reflecting mirror 28 between the decomposing dichroic mirrors 24A and 24B and reflecting mirror 25 and the projector lens 29. Therefore, the color image light can be condensed to focus on a given position and can be reflected in a desired direction, so that it is possible to increase the degree of freedom in designing the optical system.

According to the aforementioned structure, the projector 20 decomposes the projection light L20 emitted from the high luminance white light source 21 into the red light LR, green light LG, and blue light LB by the decomposing dichroic mirrors 24A, 24B and the reflecting mirror 25 which are arranged in zigzag, forms effective reflected light, i.e., the effective red light, effective green light, and effective blue light based on the image data by allowing the decomposed red light LR, green light LG, and blue light LB to be incident to their corresponding mirror light valves 26R, 26G, and 26B and reflects these effective red light, effective green light, and effective blue light by the decomposing dichroic mirrors 24A, 24B and the reflecting mirror 25 in a same direction to compose them into color image light, so that color decomposition/composition can be performed by the decomposing dichroic mirrors 24A, 24B and the reflecting mirror 25 eliminating the necessity of separately provided color decomposition and composition optical systems, and consequently it is possible to construct the optical system with ease, thereby realizing a projector which is simple and can be miniaturized.

(2) Second Embodiment

Figure 4A:
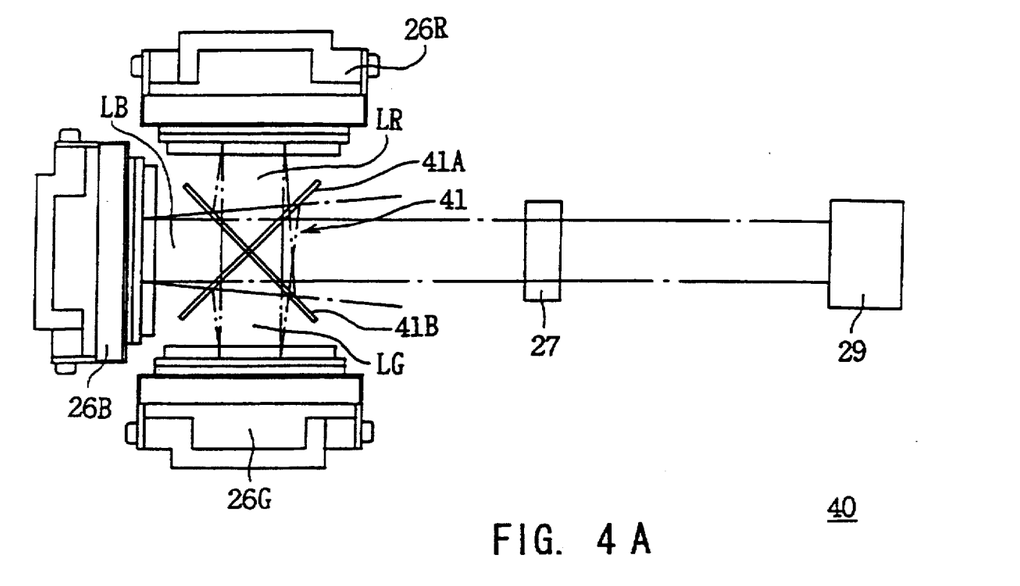
FIGS. 4A and 4B are a top view and a side view showing the structure of an optical system in a projector employing a mirror deflection type light modulator according to a second embodiment of the present invention.
Figure 4B:
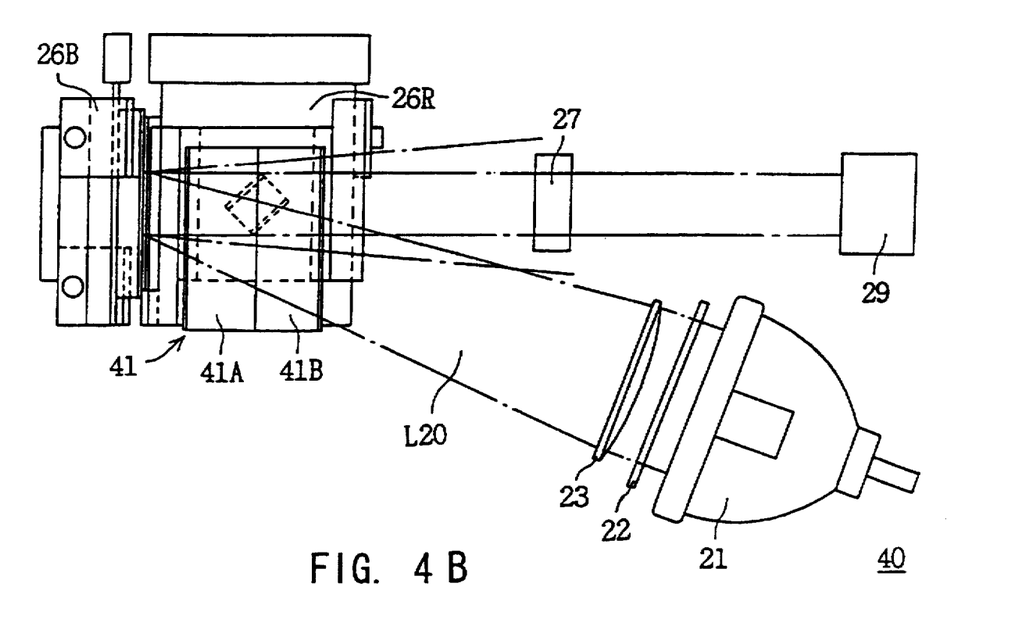

FIGS. 4A and 4B in which components corresponding to those in FIGS. 2A and 2B are denoted at same numerals show a projector 40 according to a second embodiment of the present invention, the projector 40 being constructed using a cross dichroic mirror 41 formed of two dichroic mirrors 41A and 41B which cross each other at right angles instead of the decomposing dichroic mirrors 24A, 24B and the reflecting mirror 25 which constitute the color decomposition/composition optical system in FIGS. 2A and 2B.

That is, the projection light L20 of substantially parallel light emitted from the high luminance white light source 21 successively passes through the UV cut filter 22 and an IR cut filter (not shown) in a direction having an angle of 20° relative to the horizontal axis to get rid of unnecessary ultraviolet rays and infrared rays (heat rays) and is condensed while it passes through the condenser lens 23 to be incident to the cross dichroic mirror 41.

The cross dichroic mirror 41 reflects, for example, the red light LR of the incident projection light L20 at an angle of 90° by one dichroic mirror 41A, and for example, the green light LG thereof by the other dichroic mirror 41B at an angle of −90° and allows, for example, the blue light LB thereof to pass through the cross dichroic mirror 41 for color decomposition. The red light LR, green light LG, and blue light LB are respectively incident to the reflecting surfaces of the mirror light valves 26R, 26G, and 26B at an angle of 20° which valves are arranged such that the red light LR, green light LG, and blue light LB have the same optical path length.

The mirror light valves 26R, 26G, and 26B form effective reflected light, i.e., effective red light, effective green light, and effective blue light from the incident red light LR, green light LG, and blue light LB respectively. The effective red light, effective green light, and effective blue light are reflected in a horizontal direction by the reflecting surfaces of the mirror light valves 26R, 26G, and 26B respectively to be incident to the cross dichroic mirror 41. Accordingly, the effective red light, effective green light, and effective blue light can avoid the optical paths of the red light LR, green light LG, and blue light LB to prevent interference between the former and the latter.

The cross dichroic mirror 41 reflects the incident effective red light and effective green light in a same direction at angles of 90° and −90° by the dichroic mirrors 41A and 41B respectively and allows the effective blue light to pass through the cross dichroic mirror 41 to compose them into color image light, which is incident to the relay lens 27.

In this case, since the effective red light and effective green light are reflected by the cross dichroic mirror 41, they are inverted relative to the effective blue light which has passed the cross dichroic mirror 41 with respect to their image, so that, for example, the minute mirror elements of the mirror light valves 26R and 26G for forming the effective red light and effective green light are designed to be driven under control so as to form the effective red light and effective green light based on a previously inverted image.

The relay lens 27 condenses the incident color image light to have a beam diameter which can enter the projector lens 29, and the light enters the projector lens 29.

In this case, since the reflecting surfaces of the mirror light valves 26R, 26G, and 26B are inclined at an angle of −45° relative to the horizontal axis similarly to the first embodiment set forth above, the image based on the color image light which has passed through the projector lens 29 is in a state inclined at −45°.

Accordingly in the second embodiment, the whole optical system of the projector 40 is previously inclined at 45° to correct the inclination of the image.

In this way, the color image light which has passed through the projector lens 29 is designed to be enlargedly projected onto a screen (not shown) disposed outside the projector 1 apart therefrom as a color image.

With the structure set forth above, the projector 40 decomposes the projection light L20 emitted from the high luminance white light source 21 into the red light LR, green light LG, and blue light LB by the cross dichroic mirror 41, forms the effective red light, effective green light, and effective blue light by allowing the decomposed red light LR, green light LG, and blue light LB to enter their corresponding mirror light valves 26R, 26G, and 26B respectively, and reflects the effective red light, effective green light, and effective blue light by the cross dichroic mirror 41 to compose them into the color image light.

The color decomposition optical system and the color composition optical system can be incorporated into an optical component in the projector 40 by the cross dichroic mirror 41, so that it is possible to construct the optical system more easily compared with that described in the first embodiment.

With the structure set forth above, the projection light L20 emitted from the high luminance white light source 21 is decomposed by the cross dichroic mirror 41 into the red light LR, green light LG, and blue light LB, which are incident to their corresponding mirror light valves 26R, 26G, and 26B to be converted into effective reflected light, forming effective red light and effective green light based on an image inverted relative to that based on the effective blue light and the effective blue light, and the effective red light, effective green light, and effective blue light are composed into color image light by the cross dichroic mirror 41. Therefore, it is possible to construct the optical system more easily, thus realizing a projector which is simple and can be miniaturized.

(3) Other Embodiments

The second embodiment discussed above has dealt with a case where the minute mirror elements of the mirror light valves 26R and 26G which formed the effective red light and effective green light were driven under control to form the effective red light and effective green light which had been previously inverted, since the effective red light, effective green light, and effective blue light formed by the mirror light valves 26R, 26G, and 26B respectively were incident to the cross dichroic mirror 41 so that an image based on the effective red light and effective green light was inverted relative to that based on the effective blue light. However, the present invention is not limited thereto, but the effective red light and effective green light can be reflected by a reflecting mirror in advance and then incident to the cross dichroic mirror 41 to correct the inversion of the effective red light and effective green light.

Figure 5A:
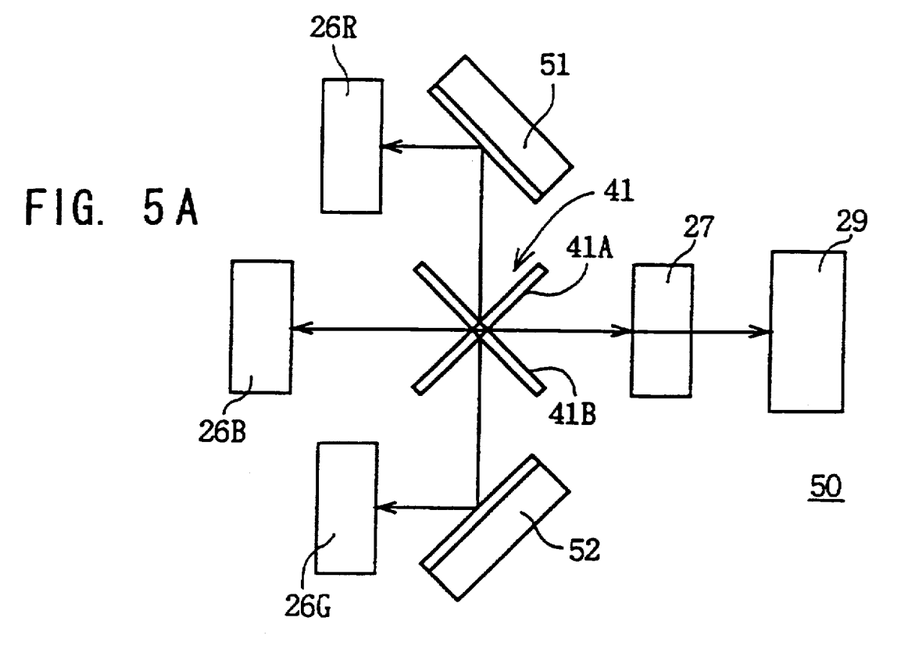
FIGS. 5A and 5B are a schematic top view and a schematic side view showing the structure of an optical system in a projector employing a mirror deflection type light modulator according to another embodiment of the present invention.
Figure 5B:
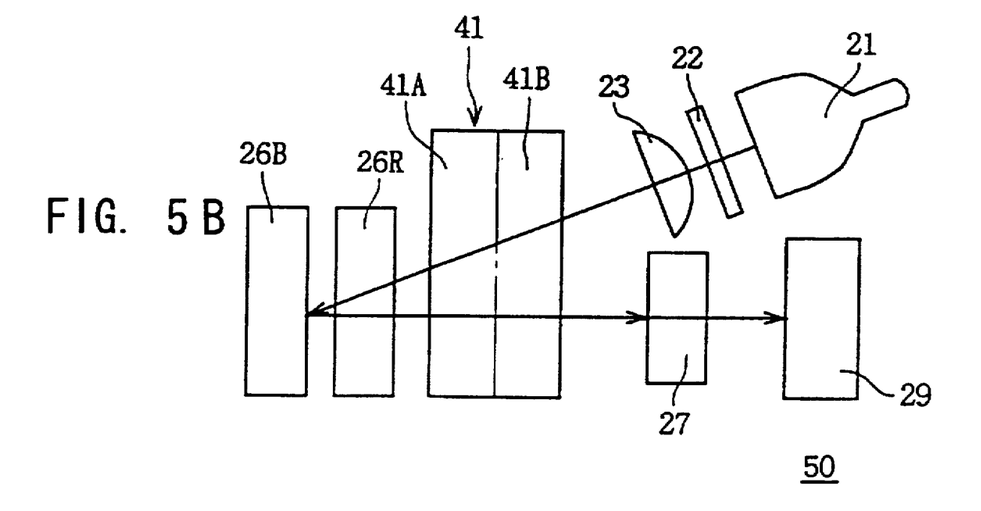

As shown in FIGS. 5A and 5B in which the same components are denoted at same numerals as those in FIGS. 2A and 2B, a projector 50 decomposes in color the projection light L20 emitted from the high luminance white light source 21 by allowing the projection light L20 to be incident to the cross dichroic mirror 41, reflects the red light LR by a dichroic mirror 41A thereof and the green light LG by the other dichroic mirror 41B thereof and allowing the blue light LB to pass through the cross dichroic mirror 41.

The red light LR of these red light LR, green light LG, and blue light LB is incident to the mirror light valve 26R by a reflecting mirror 51, the green light LG is incident to the mirror light valve 26G by a reflecting mirror 52, and the blue light LB is incident to the mirror light valve 26B as it is. Accordingly, the mirror light valves 26R, 26G, and 26B form the effective red light, effective green light, and effective blue light based on their corresponding image data, and allow the effective red light and effective green light to be incident to the cross dichroic mirror 41 via the reflecting mirrors 51 and 52.

In this way, the cross dichroic mirror 41 reflects the effective red light and effective green light in a same direction and allows the effective blue light to pass therethrough so as to compose these effective red light, effective green light, and effective blue light into color image light.

As described above, the projector 50 is designed to prevent the inversion of the image based on the effective red light and effective green light by reflecting the effective red light and effective green light twice by the reflecting mirrors 51 and 52 and the dichroic mirrors 41A and 41B respectively.

Further, the first and second embodiments discussed above have dealt with a case in which the projection light L20 emitted from the high luminance white light source 21 is condensed as it passes through a condenser lens 23. However, the present invention is not limited thereto, but the projection light L20 can be formed into parallel light having a given beam diameter, for example, using two condenser lenses.

Further, the first and second embodiments discussed above have dealt with a case in which white light was decomposed into red light, green light, and blue light, which were incident to the first, second, and third mirror deflection type light modulators and the decomposing dichroic mirrors 24A, 24B and the reflecting mirror 25 and the cross dichroic mirror 41 were provided as a color decomposition/ composition means for composing together the first effective reflected light to third effective reflected light obtained from the first, second, and third mirror deflection type light modulators. However, the present invention is not limited thereto, but other various color decomposition/composition means can be employed so long as it can decompose white light into red light, green light, and blue light, which are incident to the first, second, and third mirror deflection type light modulators and compose together the first effective reflected light to third effective reflected light obtained from the first, second, and third mirror deflection type light modulators.

Furthermore, the first and second embodiments discussed above have dealt with a case wherein the present invention was applied to the projectors 20 and 40. However, the present invention is not limited thereto, but is also applicable to TVs and the like.

As described above according to the present invention, white light is decomposed by a color decomposition/ composition means into red light, green light, and blue light, which are incident to first, second, and third mirror deflection type light modulators and first effective reflected light to third effective reflected light obtained by the first, second, and third mirror deflection type light modulators are composed together, so that color decomposition/composition can be performed by the color decomposition/composition means eliminating the necessity of separately provided color decomposition and composition optical systems, and consequently it is possible to construct an optical system with ease, thereby realizing a projector which is simple and can be miniaturized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A projector comprising a first, a second, and a third mirror deflection type light modulators each of which is composed of a plurality of minute mirror elements arranged on a plane corresponding to pixels of an image data, wherein red light, green light, and blue light decomposed from white light are incident to the first, second, and third mirror deflection type light modulators, which are subjected to light modulation according to red, green, and blue components of said image data, so that first effective reflected light to third effective reflected light which are respectively composed of red, green, and blue components corresponding to said image data and which are obtained by said first, second, and third mirror deflection type light modulators are composed together to be projected onto a screen, thereby displaying an image based on said image data thereon, said projector comprising:

a color decomposition/composition means operable for both color decomposition and composition composed of mirrors in a perpendicular arrangement for decomposing said white light into said red light, said green light, and said blue light, which are incident to said first, second, and third mirror deflection type light modulators respectively, and for composing together said first effective reflected light to third effective reflected light respectively obtained by said first, second, and third mirror deflection type light modulators.

2. The projector according to claim 1, comprising a relay lens, provided between said color decomposition/ composition means and said screen, for condensing said first effective reflected light to third effective reflected light composed together by said color decomposition/composition means to focus said first effective reflected light to third effective reflected light at a given position.

3. The projector according to claim 1, comprising a reflecting mirror, provided between said color decomposition/composition means and said screen, for reflecting in a given direction said first effective reflected light to third effective reflected light composed together by said color decomposition/ composition means.

4. The projector according to claim 1, comprising:

a relay lens, provided between said color decomposition/ composition means and said screen, for condensing said first effective reflected light to third effective reflected light composed together by said color decomposition/composition means to focus said first effective reflected light to third effective reflected light at a given position; and reflecting mirrors for reflecting in a given direction said first effective reflected light to said third effective reflected light which have been condensed.

5. The projector according to claim 1, wherein:

said color decomposition/composition is composed of first and second mirrors wherein said first mirror is in a first plane and said second mirror is in a second plane, the first and second planes intersecting each other perpendicularly.

6. A projector comprising a first, a second, and a third mirror deflection type light modulators each of which is composed of a plurality of minute mirror elements arranged on a plane corresponding to pixels of an image data, wherein red light, green light, and blue light decomposed from white light are incident to the first, second, and third mirror deflection type light modulators, which are subjected to light modulation according to red, green, and blue components of said image data, so that first effective reflected light to third effective reflected light which are respectively composed of red, green, and blue components corresponding to said image data and which are obtained by said first, second, and third mirror deflection type light modulators are composed together to be projected onto a screen, thereby displaying an image based on said image data thereon, said projector comprising:

a color decomposition/composition means for decomposing said white light into said red light, said green light, and said blue light, which are incident to said first, second, and third mirror deflection type light modulators respectively, and for composing together said first effective reflected light to third effective reflected light respectively obtained by said first, second, and third mirror deflection type light modulators, wherein:

said decomposition/composition means is composed of a cross dichroic mirror and said red light, said green light, and said blue light are incident to said first, second, and third mirror deflection type light modulators respectively; and said first or said second and third mirror deflection type light modulators are modulated in accordance with an image data based on an image inverted relative to said image based on said image data.

7. A projector comprising a first, a second, and a third mirror deflection type light modulators each of which is composed of a plurality of minute mirror elements arranged on a plane corresponding to pixels of an image data, wherein red light, green light, and blue light decomposed from white light are incident to the first, second, and third mirror deflection type light modulators, which are subjected to light modulation according to red, green, and blue components of said image data, so that first effective reflected light to third effective reflected light which are respectively composed of red, green, and blue components corresponding to said image data and which are obtained by said first, second, and third mirror deflection type light modulators are composed together to be projected onto a screen, thereby displaying an image based on said image data thereon, said projector comprising:

a color decomposition/composition means for decomposing said white light into said red light, said green light, and said blue light, which are incident to said first, second, and third mirror deflection type light modulators respectively, and for composing together said first effective reflected light to third effective reflected light respectively obtained by said first, second, and third mirror deflection type light modulators, wherein:

said color decomposition/composition means is composed of a cross dichroic mirror and a pair of reflecting mirrors arranged symmetrically with each other with respect to a center of said cross dichroic mirror.

8. A projector comprising a first, a second, and a third mirror deflection type light modulators each of which is composed of a plurality of minute mirror elements arranged on a plane corresponding to pixels of an image data, wherein red light, green light, and blue light decomposed from white light are incident to the first, second, and third mirror deflection type light modulators, which are subjected to light modulation according to red, green, and blue components of said image data, so that first effective reflected light, second effective reflected light and third effective reflected light which are respectively composed of red, green, and blue components corresponding to said image data and which are obtained by said first, second, and third mirror deflection type light modulators, respectively, are composed together to be projected onto a screen, thereby displaying an image based on said image data thereon, said projector comprising:

a color decomposition/composition means for decomposing said white light into said red light, said green light, and said blue light, which are incident to said first, second, and third mirror deflection type light modulators respectively, and for composing together said first effective reflected light, said second effective reflected light and said third effective reflected light respectively obtained by said first, second, and third mirror deflection type light modulators, a relay lens, provided between said color decomposition/composition means and said screen, for condensing said first effective reflected light, said second effective reflected light and said third effective reflected light composed together by said color decomposition/composition means to focus said first effective reflected light, said second effective reflected light and said third effective reflected light at a given position.

* * * * *

UNITED STATES PATENT AND TRADEMARK OFFICE
CERTIFICATE OF CORRECTION

PATENT NO. : 5,895,109
DATED      : April 20, 1999
INVENTOR(S): Yamaguchi et al.

It is certified that error appears in the above-identified patent and that said Letters Patent is hereby corrected as shown below:

On the title page, item [73] Assignees, should read:

Sony Corporation, Tokyo, Japan, and
        Texas Instruments Incorporated,
        Dallas, Texas.

Signed and Sealed this

Twenty-sixth Day of October, 1999

*Attest:*

Q. TODD DICKINSON

*Attesting Officer*      *Acting Commissioner of Patents and Trademarks*